March 15, 1960     L. R. BLOCKER     2,928,484
CULTIVATING AND WEEDER ATTACHMENT FOR TRACTORS
Filed Oct. 19, 1956
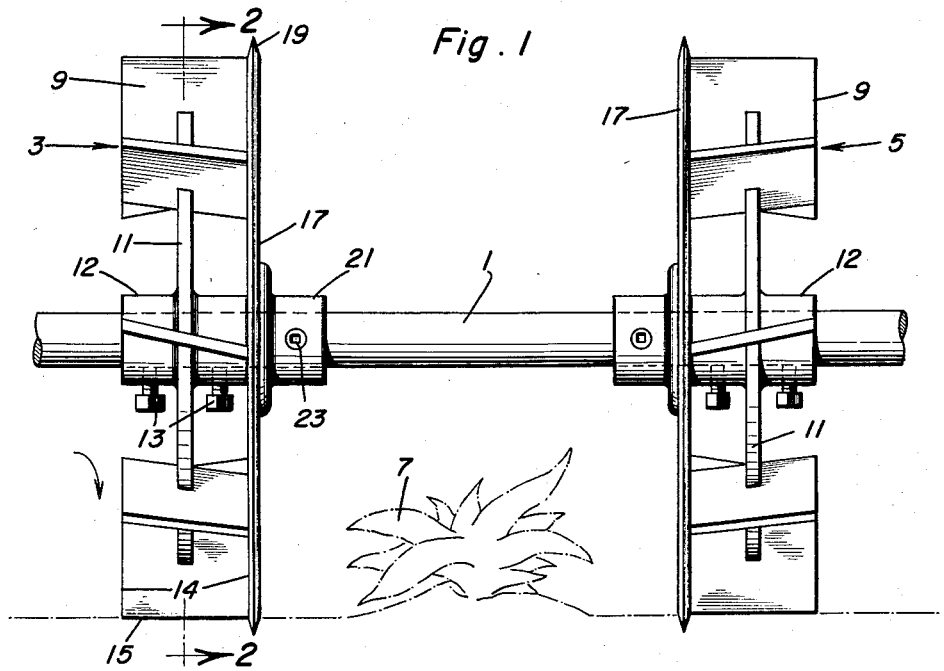
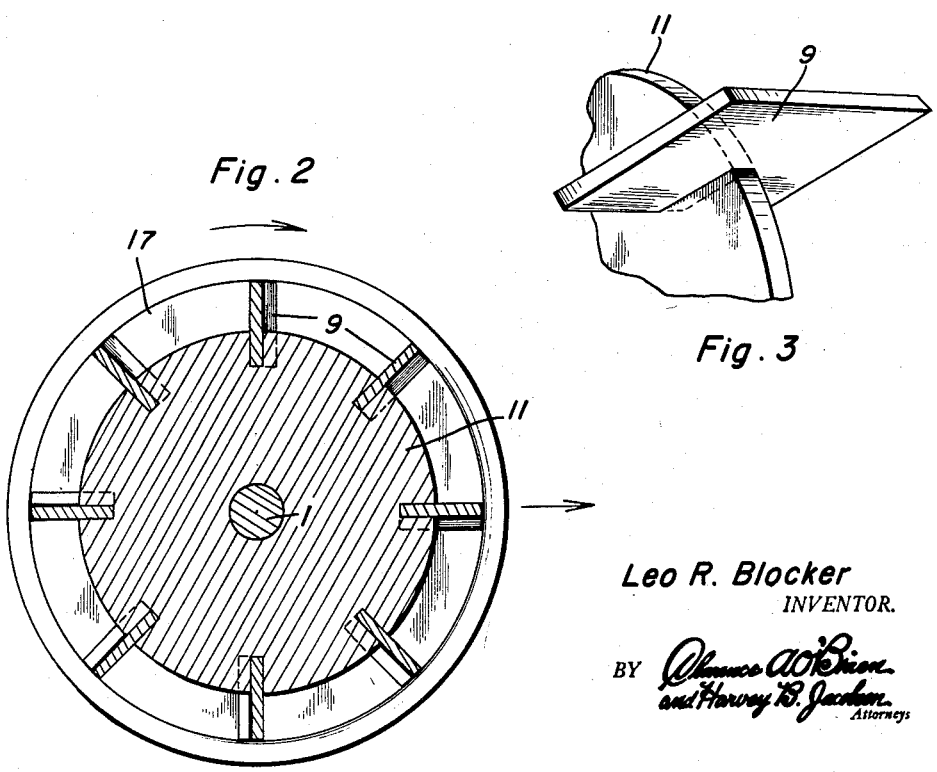
Leo R. Blocker
INVENTOR.

United States Patent Office 2,928,484
Patented Mar. 15, 1960

2,928,484

CULTIVATING AND WEEDER ATTACHMENT FOR TRACTORS

Leo R. Blocker, Grand Forks, N. Dak., assignor of twenty-five percent to Donald Endres and Berniece Endres and twenty-five percent to Rodell Endres and Gloria Endres, all of Grand Forks, N. Dak.

Application October 19, 1956, Serial No. 617,032

1 Claim. (Cl. 172—549)

My invention relates to improvements in rotary row crop cultivating and weeding devices for attachment to a tractor, or the like, for down the row cultivating and/or weeding of sugar beets, corn, soya beans, and other such crops.

The primary object of my invention is to provide a pair of right and left cultivating and weeding units for straddling row crops and which are mounted on a shaft rotatably attachable to a tractor crosswise thereof for rotation by the power take-off of the tractor to revolve the units as the tractor travels forwardly, the units being constructed and arranged so that in weeding operations they will throw weeds rearwardly outwardly and away from a row of plants straddled thereby, and in cultivating will throw earth or soil rearwardly and inwardly toward the row for hilling purposes.

Another object is to provide the units with earth or soil crust cutting means baffling weeds away from the row in weeding operations and earth toward the row in cultivating and hilling operations.

These together with objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a view in front elevation of the cultivating and weeding device detached;

Figure 2 is a view in vertical section taken on the line 2—2 of Figure 1; and

Figure 3 is an enlarged fragmentary view in perspective of a flange and one of the cultivating and weeding blades forming part of each unit.

Referring to the drawing by numerals, the shaft 1 of my improved cultivating and weeding device is adapted for suitable attachment to a tractor, not shown, beneath and crosswise of the body of the tractor for extension outwardly of said body and for forward travel therewith along a row of plants, and may be connected by any conventional means to the power take-off, not shown, of the tractor for drive thereby in the same direction as the tractor wheels.

The right and left cultivating and weeding units designated 3, 5 respectively, are laterally spaced on the shaft 1 for straddling a row of plants 7, and each comprises a plurality of rectangular cultivating and weeding ground penetrating and hoeing blades 9 spaced circumferentially and equidistantly around a central, circumferential flange 11 on an axial hub 12 secured to the shaft by a pair of set bolts 13 at opposite sides of the flange 11.

The blades 9 extend radially from the flange 11 and are pitched laterally thereof and oppositely in each unit relative to those in the other unit, and are mortised into the flange 11 to extend equidistantly from opposite sides of said flange. Further, the blades 9 are provided with horizontal straight ground engaging and penetrating edges 15 to which the sides 14 of the blades are perpendicular and said blades comprise with the flanges 11 and the hubs 12 blade assemblies which may be pulled off the shaft and reversed side-for-side. Because of the lateral pitch of the blades 9, the ground engaging edges 15 of said blades will engage the ground transversely and obliquely of a row of plants 7.

Each unit 3, 5 further includes a disk colter 17 at one side thereof having a cutting edge 19 extending beyond the edges 15 of the blades 9 to cut into the ground or sail, said colters being provided with an axial hub 21 secured on the shaft 1 by a set bolt 23 so that the colters may also be pulled off the shaft 1 and reversed side-for-side whereby the units may be reversed side-for-side all for a purpose presently seen.

Referring now to the operation of the invention, upon revolving of the units 3, 5 by the shaft 1 in the direction indicated by the arrows in Figures 1 and 2, and forward travel of the units 3, 5 in the direction indicated by the arrow in Figure 2, the blades 9 are revolved into the ground with a downward and rearward cutting and hoeing movement. Actually, the blades 9 are designed to penetrate the ground by a depth of three inches approximately.

In weeding operations the units 3, 5 are positioned on the shaft 1 with the colters 17 at the inboard sides of the blades 9, preferably in engagement therewith, and said blades inclining outwardly from the colters 17 and forwardly as regards the direction of travel of the units, also forwardly, of the rows of plants 7. When the units 3, 5 are so positioned, the blades 9 will dig up weeds and deflect the same and earth rearwardly and outwardly away from the plants 7 in a row and the colters 17 will baffle earth or soil away from the plants and cut the earth crust between the blades 9 and the plants 7 to prevent earth or soil from being dragged away from the plants.

In cultivating operations the units 3, 5 are pulled off the shaft 1 and reversed side-for-side to position the colters at the outboard sides of the blades 9, when thus positioned, the blades 9 incline from the colters 17 inwardly rearwardly toward the plants 7 and rearwardly as regards the direction of travel of the units and also rearwardly of the rows of plants so that earth or soil dug up by the blades 9 will be deflected thereby toward the plants 7, while the colters 17 will baffle earth towards the plants for hilling purposes. Also the colters 17 will cut into the earth crust to facilitating hilling by preventing back sliding of earth dug up by the blades away from the plants.

The shaft 1 may be of a length suitable for attaching thereto a number of pairs of units 3, 5 for multiple row cultivating and weeding.

The units 3, 5 may also be used to cross block sugar beet or other plants at desired spacings by adjusting the units along the shaft 1.

In cultivating in wet earth or soil, the units 3, 5 will mulch soil close to the plants and thereby urge moisture in the soil toward the plants to facilitate their growth.

By having the blades 9 penetrate the earth or soil, as described, in weeding, weeds will be dug up by the roots and thrown rearwardly of the units so that they will not grow again.

The foregoing is considered as illustrative only of the principles of the invention. Further, since numerous modifications and changes will readily occur to those skilled in the art it is not desired to limit the invention to the exact construction and operation shown and described, and accordingly, all suitable modifications and equivalents may be resorted to, falling within the scope of the invention as claimed.

What is claimed as new is as follows:

A cultivating and weeding device comprising a shaft rotatably attachable to a tractor crosswise thereof for travel with the tractor, a pair of cultivating and weeding units on said shaft revolved thereby and laterally spaced apart to straddle a row of plants, said units each including a circumferentially flanged hub fixed on said shaft, and straight, rectangular cultivating and weeding digger blades spaced circumferentially around said flange and extending radially therefrom for revolving into the ground with straight horizontal ground penetrating edges and straight parallel side edges at opposite sides of the flange, said units each also including a crust cutting disk type colter on the shaft fitting against the sides of the blades at one side of the flange for digging into the ground and baffling weeds and earth toward and against said blades, said blades being pitched throughout their entire area laterally of the line of travel of the units to incline diagonally of a row of plants for digging up and deflecting weeds away from a row of plants, and the units being interchangeable on said shaft to reverse the angle of inclination of said blades to dig up and deflect earth toward a row of plants for hilling the plants, said blades being morticed into said flanges for securement thereto and having opposite faces planar throughout the entire area thereof whereby dug up earth and weeds will readily slide off said blades.

References Cited in the file of this patent

UNITED STATES PATENTS

| | | |
|---|---|---|
| 1,331,200 | Hoefen | Feb. 17, 1920 |
| 2,243,241 | Burns | May 27, 1941 |
| 2,529,417 | Pitre | Nov. 7, 1950 |
| 2,678,595 | Peters | May 18, 1954 |
| 2,764,925 | Kalla et al. | Oct. 2, 1956 |

FOREIGN PATENTS

| | | |
|---|---|---|
| 80,766 | Denmark | Mar. 12, 1956 |
| 672,719 | Great Britain | May 28, 1952 |